(12) United States Patent
Shankar et al.

(10) Patent No.: US 11,885,228 B2
(45) Date of Patent: Jan. 30, 2024

(54) SYSTEM AND METHOD FOR INSPECTING FAN BLADE TIP CLEARANCE RELATIVE TO AN ABRADABLE FAN CASE

(71) Applicant: General Electric Company, Schenectady, NY (US)

(72) Inventors: Subramanya Shankar, Bengaluru (IN); Marc Christopfel, Evendale, OH (US); Brian G. Quinn, West Chester, OH (US); Omar A. Ramirez, Queretaro (MX); Sean M. O'Melia, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/667,793

(22) Filed: Feb. 9, 2022

(65) Prior Publication Data

US 2023/0250730 A1 Aug. 10, 2023

(51) Int. Cl.
*F01D 21/00* (2006.01)
*F01D 11/14* (2006.01)
(Continued)

(52) U.S. Cl.
CPC .......... *F01D 21/003* (2013.01); *F01D 11/14* (2013.01); *F05D 2260/30* (2013.01);
(Continued)

(58) Field of Classification Search
CPC ......... F01D 21/003; F01D 11/14; G01C 9/02; G01C 3/00; G01C 5/00; G01B 11/14;
(Continued)

(56) References Cited

U.S. PATENT DOCUMENTS 6,637,186 B1 * 10/2003 Van Duyn ............... F01D 21/04
60/226.1
8,573,078 B2 11/2013 Sue
(Continued)

FOREIGN PATENT DOCUMENTS

| EP | 2249151 A1 | 11/2010 |
| EP | 2532174 A1 | 12/2012 |
| WO | 202116568 A1 | 1/2021 |

OTHER PUBLICATIONS

Extended European Search Report for application No. 23 15 4078 dated Jun. 21, 2023.

*Primary Examiner* — Topaz L. Elliott
*Assistant Examiner* — Ryan C Clark
(74) *Attorney, Agent, or Firm* — Carter, DeLuca & Farrell LLP; George Likourezos; Jason B. Scher

(57) ABSTRACT

A system and method for inspecting fan blade clearances in a fan stator module are presented. The method includes rotating a fan rotor assembly that includes an attached bracket situated between adjacent fan blades connected to the fan rotor assembly. The bracket includes a laser module and an inclinometer configured to measure a circumferential position of the laser module. The method further includes projecting a laser beam from the laser module to the fan case to determine a distance measurement between the laser module and the fan case at multiple circumferential points around the fan case. The distance measurement and circumferential position data is processed by a computing device to determine a clearance distance between a fan blade and the fan case.

18 Claims, 11 Drawing Sheets

(51) Int. Cl.
*G01B 11/14* (2006.01)
*G01C 9/02* (2006.01)

(52) U.S. Cl.
CPC .... *F05D 2260/80* (2013.01); *F05D 2270/305* (2013.01); *F05D 2270/804* (2013.01); *G01B 11/14* (2013.01); *G01C 9/02* (2013.01)

(58) Field of Classification Search
CPC ............ F05D 2260/30; F05D 2260/80; F05D 2270/305; F05D 2270/804
See application file for complete search history.

(56) References Cited

U.S. PATENT DOCUMENTS

| | | | |
|---|---|---|---|
| 8,599,082 B2 | 12/2013 | Mitchell | |
| 9,068,906 B2 | 6/2015 | Silieti | |
| 9,071,888 B2 | 6/2015 | Subramanian | |
| 9,709,463 B2 | 7/2017 | DeAscanis | |
| 9,915,518 B2 | 3/2018 | Leroux | |
| 10,480,345 B2 | 11/2019 | Dardona | |
| 10,920,605 B2 | 2/2021 | Lipstein | |
| 11,409,022 B2* | 8/2022 | Schleif | G01B 11/14 |
| 2012/0173197 A1* | 7/2012 | Craig | F01D 25/28 702/159 |
| 2015/0090017 A1* | 4/2015 | Silieti | F01D 17/20 73/112.01 |
| 2015/0092039 A1* | 4/2015 | Ruhge | G01N 21/8803 348/82 |
| 2015/0204210 A1* | 7/2015 | Ticehurst | G01N 29/225 73/112.01 |
| 2017/0003393 A1* | 1/2017 | Monks | G01B 11/306 |
| 2018/0202313 A1* | 7/2018 | Jasklowski | F01D 17/02 |
| 2019/0072511 A1* | 3/2019 | Warren | G01B 7/14 |
| 2019/0195084 A1* | 6/2019 | Lipstein | G01B 11/27 |
| 2019/0353473 A1* | 11/2019 | Warren | F01D 21/003 |
| 2019/0376411 A1* | 12/2019 | Ball | F01D 21/003 |
| 2020/0056501 A1* | 2/2020 | Eastment | G06T 7/001 |
| 2020/0180084 A1* | 6/2020 | Lipkin | F01D 21/003 |
| 2021/0060721 A1* | 3/2021 | Gameros Madrigal | B23Q 17/20 |
| 2021/0140337 A1* | 5/2021 | Claussen | G01H 9/00 |
| 2021/0164359 A1* | 6/2021 | Shenouda | F01D 21/003 |

* cited by examiner

SYSTEM AND METHOD FOR INSPECTING FAN BLADE TIP CLEARANCE RELATIVE TO AN ABRADABLE FAN CASE

FIELD

This disclosure relates generally to fans having a fan rotor and fan containment casing or shell, particularly directed to a system and method for inspecting and measuring fan blade tip clearance to the fan abradable surface on an inner diameter of a casing in relation to the fan rotor.

BACKGROUND

In an axial flow turbine engine, air is compressed in a compressor section, mixed with fuel, and combusted in a combustor section, and expanded through a turbine section that drives the compressor section. Efficiency of such engines is a function of multiple factors including how the compressor section compresses the air and the efficiency with which the turbine expands the products of combustion. Efficiency is also dependent on minimizing the clearance between the blade tips of a rotor and the casing surrounding the rotor.

During the manufacturing process technicians typically perform measurement checks on the clearance distance of each fan blade tip of a fan rotor and the fan casing. Technicians may then adjust the thickness of abradable layers by grinding an abradable surface. Such measurement checks may also be done throughout the life of a fan at regular maintenance intervals or during fan abradable repairs.

However, these measurement checks can be time consuming. For example, a method of measuring blade tip clearance may involve the removal of a spinner cone and a fan blade, where such removal could take hours. In addition, removing fan blades from a fan and the large size of a fan requires scaffolding to reach heights and may also require multiple workers, thus increasing the cost associated with such inspections. Further, the removal of any pieces during a fan inspection may also lead to exposing additional parts and necessitate further inspections and subsequent repairs.

Ensuring proper clearances of the fan blades to the fan casing allows the fan to operate most efficiently, reduces the likelihood of blade tips rubbing on the fan abradable inner diameter of the fan case or fan blades rubbing on this same abradable surface, and reduces the likelihood of uneven part wear that may result from uneven air flows through the fan. An alignment process may be performed during initial build or installation of the fan and may also be performed during outages in which the propulsor and/or fan module have been moved. The ability to the operator of the fan to correct misalignment and/or undesirable clearances between the fan blades and the respective portion of the fan case ensures operational efficiency, fuel efficiency and fan stall margin.

A system is needed for quickly and accurately inspecting fan blade clearance relative to the fan abradable on an inner dimension of a fan casing shell.

DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use the present disclosure.

Additionally, the left-most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may functionally the same, but may be located at different points in a simulation arena).

FIGS. 5A, 5B, 5C, 5D, and 5E depict multiple views of a bracket used for inspecting fan blade tip clearance, according to an embodiment of the present disclosure.

Figure 6A:
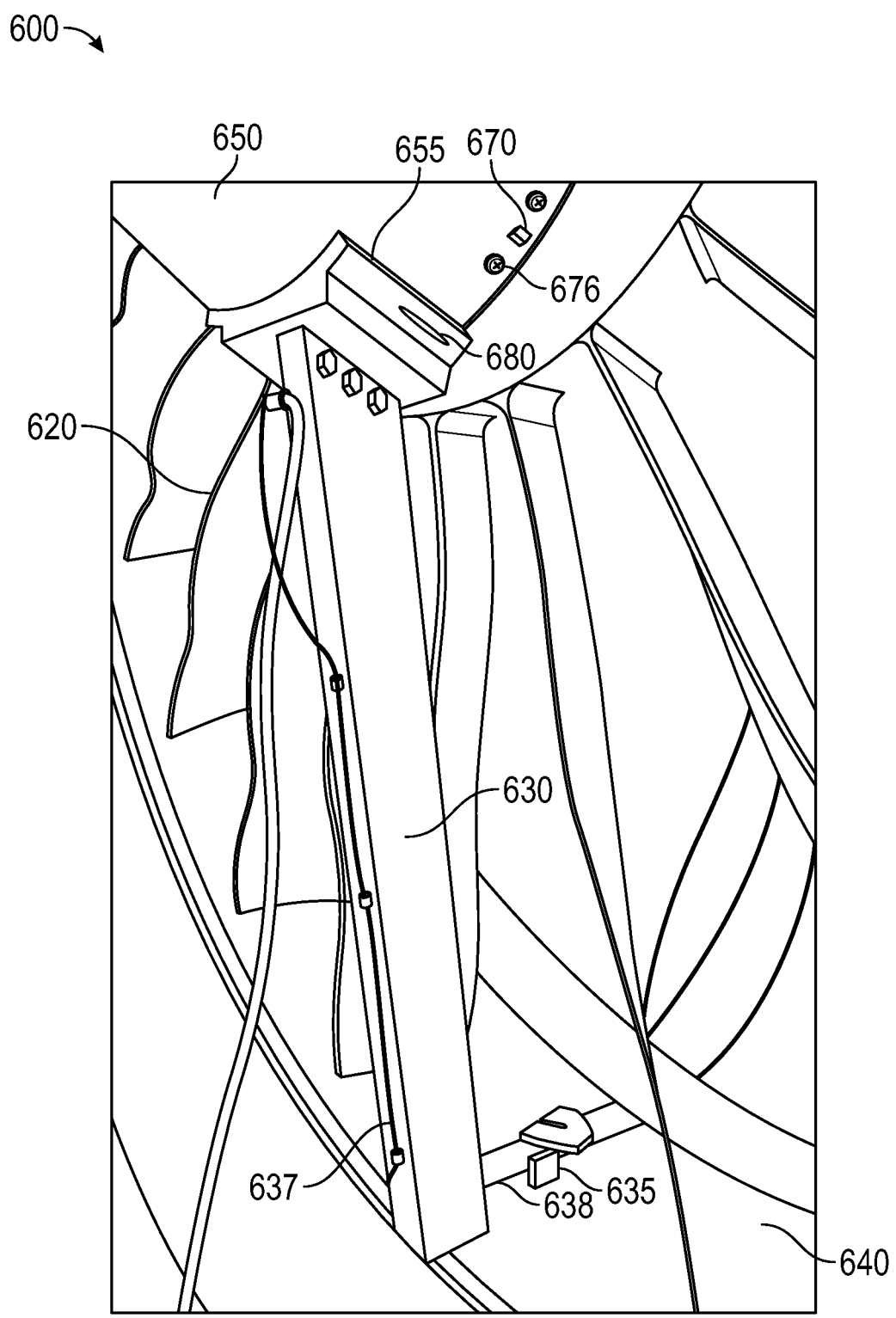
Figure 6B:
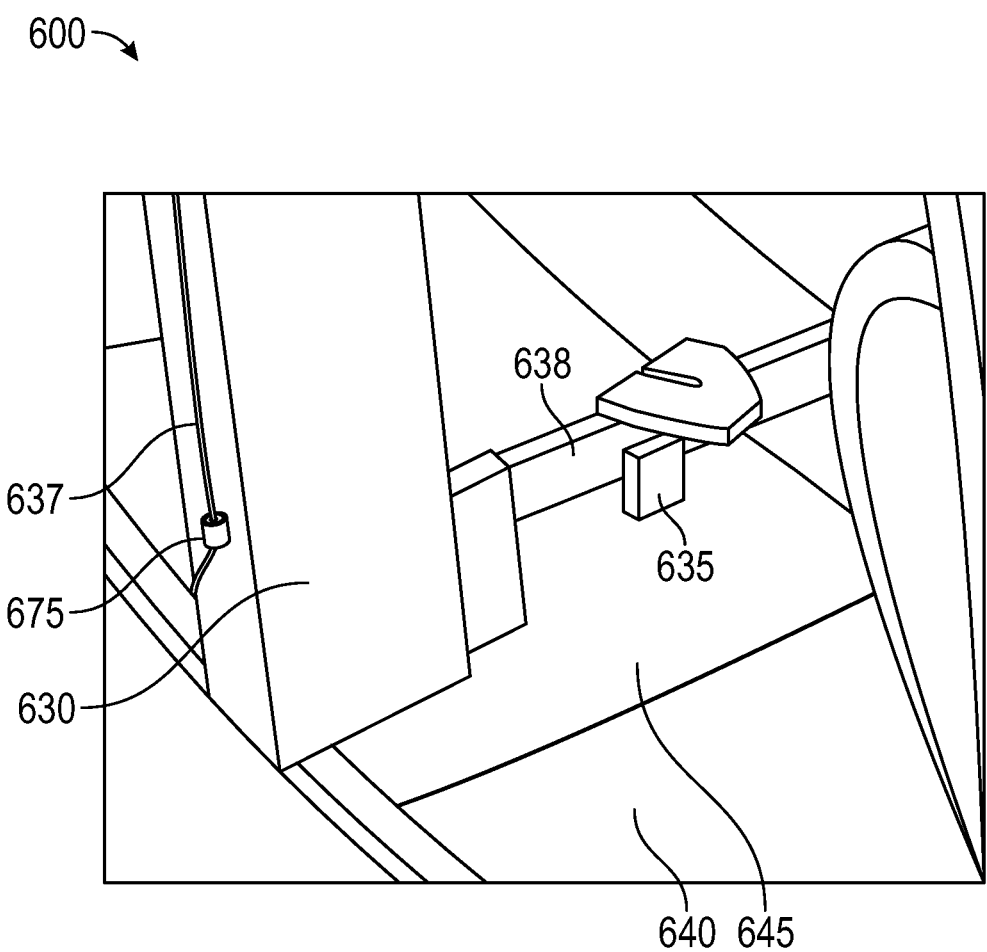

FIGS. 6A and 6B illustrate a spinner cone mounted bracket for inspecting blade tip clearance, according to an embodiment of the present disclosure.

Figure 7:
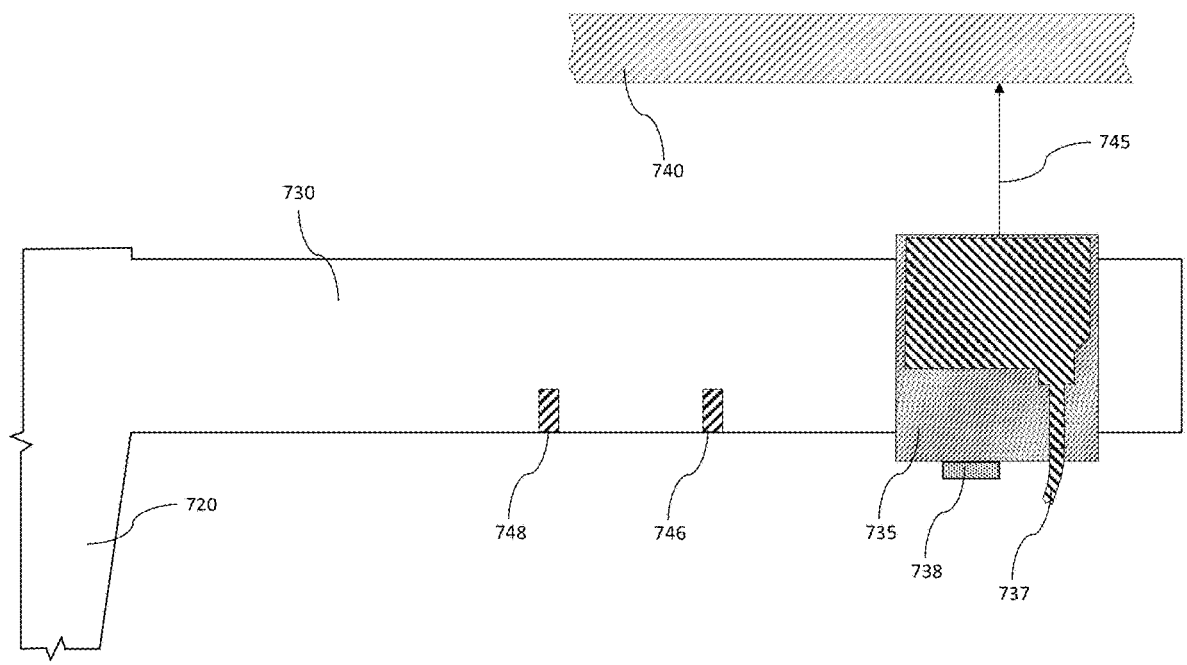

FIG. 7 depicts the head of a bracket for inspecting blade tip clearance with a laser sensor at a first position, according to an embodiment of the present disclosure.

Figure 8:
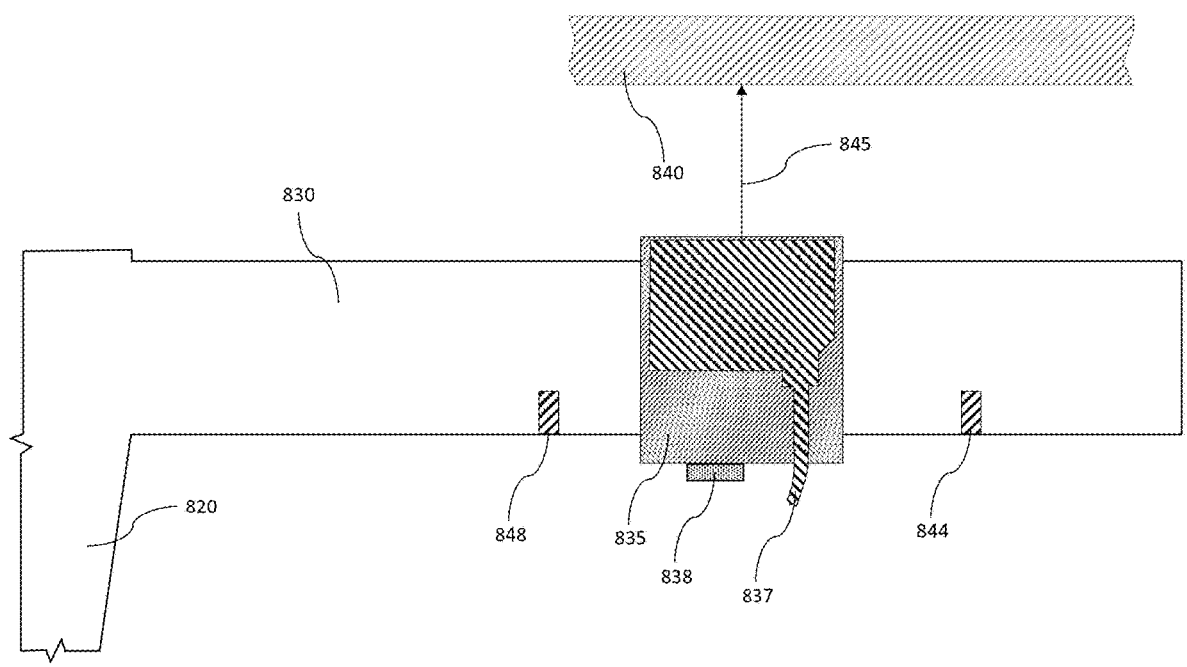

FIG. 8 depicts the head of a bracket for inspecting blade tip clearance with a laser sensor at a second position, according to an embodiment of the present disclosure.

Figure 9:
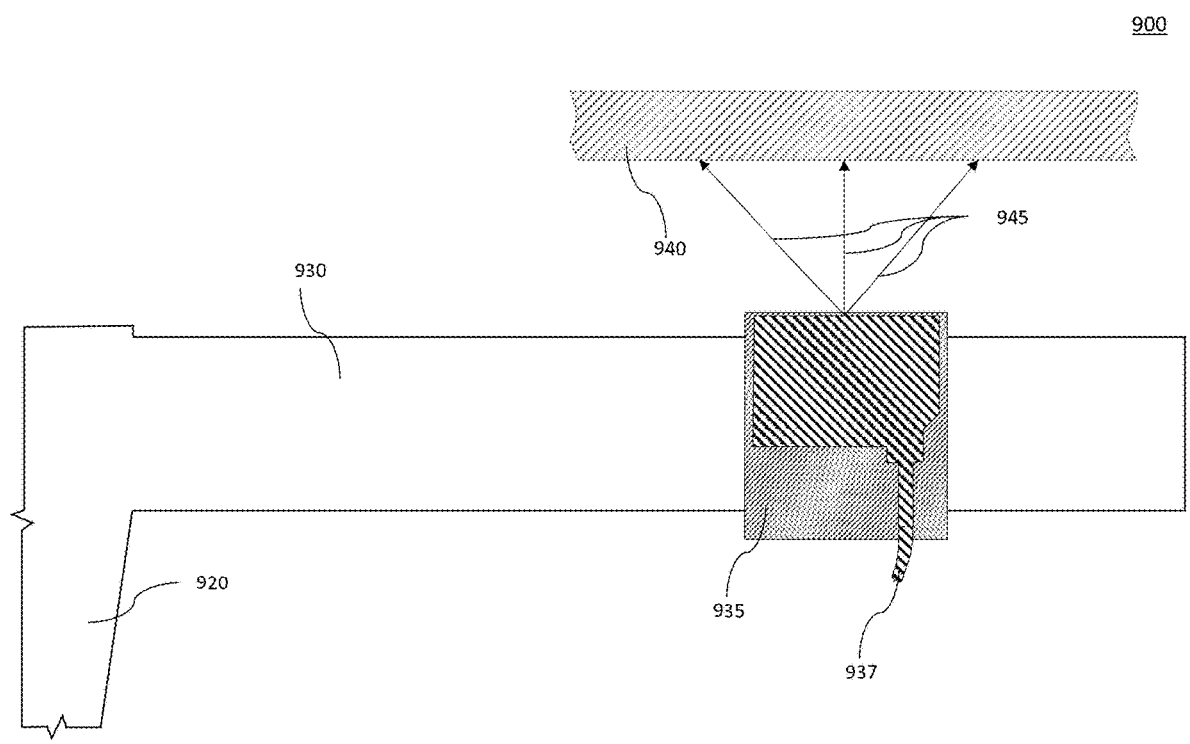

FIG. 9 depicts the head of a bracket for inspecting blade tip clearance with a scanning laser sensor, according to an embodiment of the present disclosure.

Figure 10:
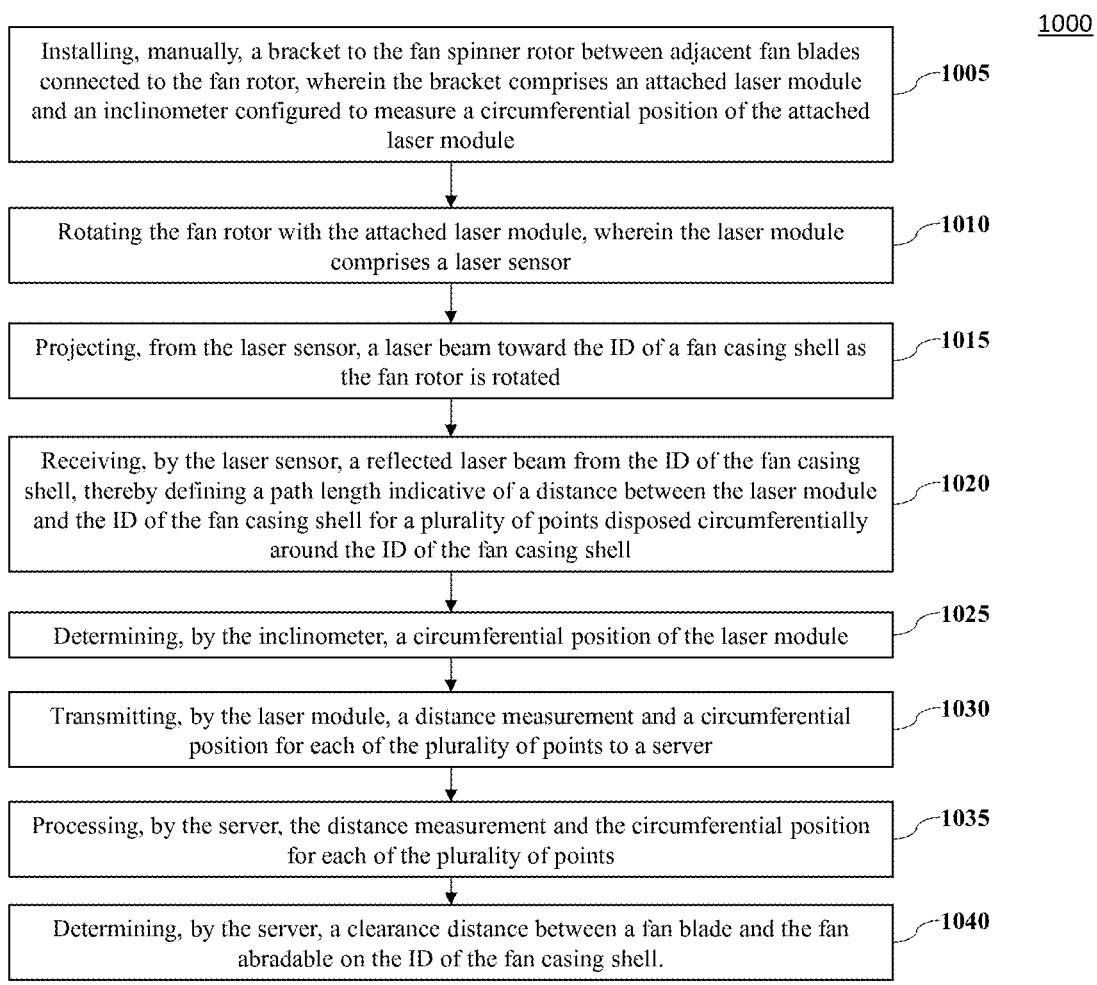

FIG. 10 depicts a flowchart of a method for inspecting blade tip clearance, according to an embodiment of the present disclosure.

Further embodiments, features, and advantages of the present disclosure, as well as the operation of the various embodiments of the present disclosure, are described below with reference to the accompanying figures.

DETAILED DESCRIPTION OF THE DISCLOSURE

While embodiments described herein are illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

To clearly describe the current system and method for inspecting fan blade clearance, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine. Additionally, the terms "leading" and "trailing" may be used and/or understood as being similar in description as the terms "forward" and "aft," respectively. "Leading" may be used to describe, for example, a surface of a fan blade over which a fluid initially flows, and "trailing" may be used to describe a surface of the fan blade over which the fluid finally flows.

Figure 2:
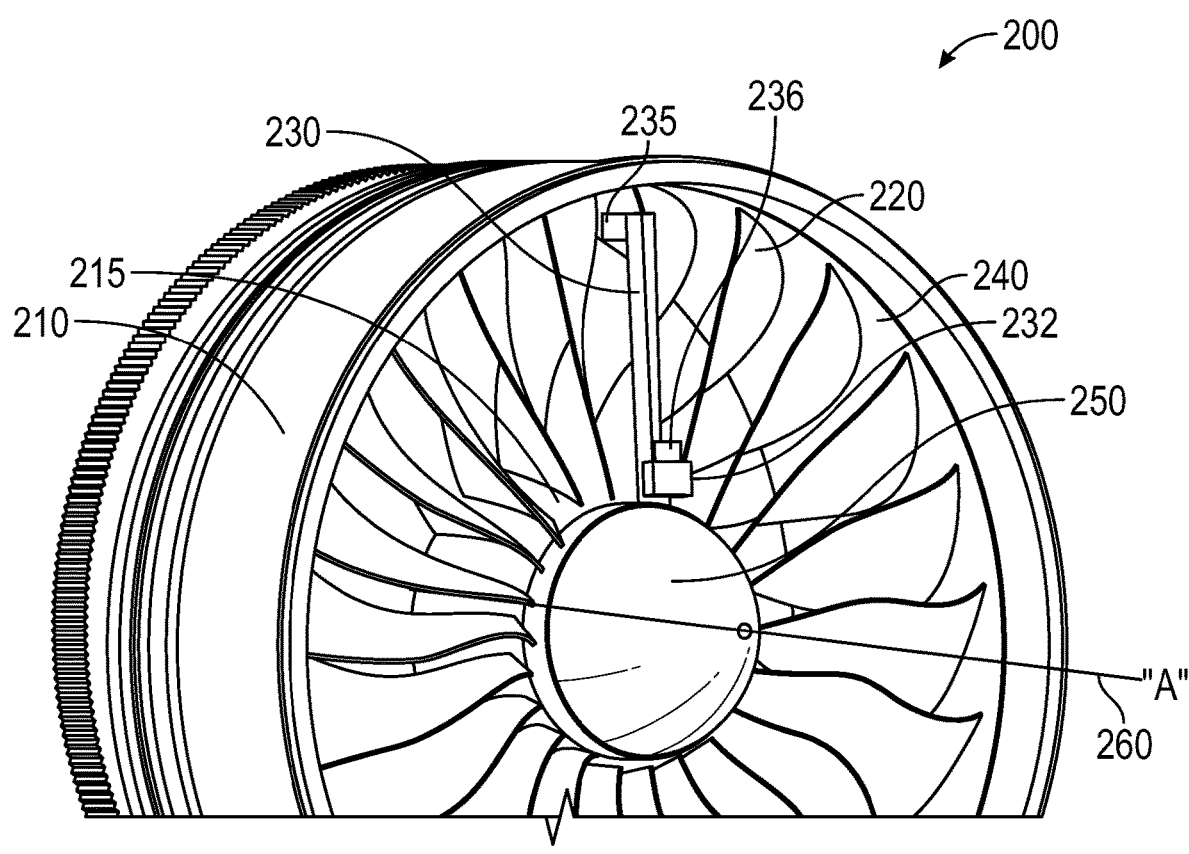
FIG. 2 illustrates a blade tip clearance system affixed to a fan spinner cone, according to an embodiment of the present disclosure.

It is often required to describe parts that are at differing radial, axial and/or circumferential positions. For example, as shown in FIG. 2, the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position or direction of objects along an axis "R," which is substantially perpendicular with axis A and intersects axis A at only one location. Finally, the term "circumferential" refers to movement or position around axis A (e.g., axis "C"). The term "circumferential" may refer to a dimension extending around a center of any suitable shape (e.g., a polygon) and is not limited to a dimension extending around a center of a circular shape.

The disclosure relates generally to gas turbines having a compressor casing and a turbine shell, and more particularly, to a system and method for inspecting fan blade clearance relative to an inner diameter ("ID") of a fan casing shell in relation to the fan rotor. Such measurements may be necessary during manufacturing and during outages, when the gas turbine is inactive (e.g., during an inspection or maintenance period). Any reference made herein to "a casing" or "the casing" should be read to encompass either the fan casing or the fan shell unless specific context dictates otherwise. The casing may be a single wall casing. Reference herein to a "rotating blade" should be understood as referring to a fan blade unless specific context dictates otherwise.

As used herein, the term "turbine" refers to any type of turbine engine, e.g., turbojet, turboprop, turbofan, turboshaft, using any type of fuel. While the figures ae directed to the use of turbines used in aircraft, the disclosure is not limited to airplane turbines and are equally applicable to any type of turbine engine.

Various embodiments of the system and method are discussed below with reference to FIGS. 1-10. However, those skilled in the art will readily appreciate that the detailed description given herein with respect to these FIGs is for explanatory purposes only and should not be construed as limiting.

Figure 1:
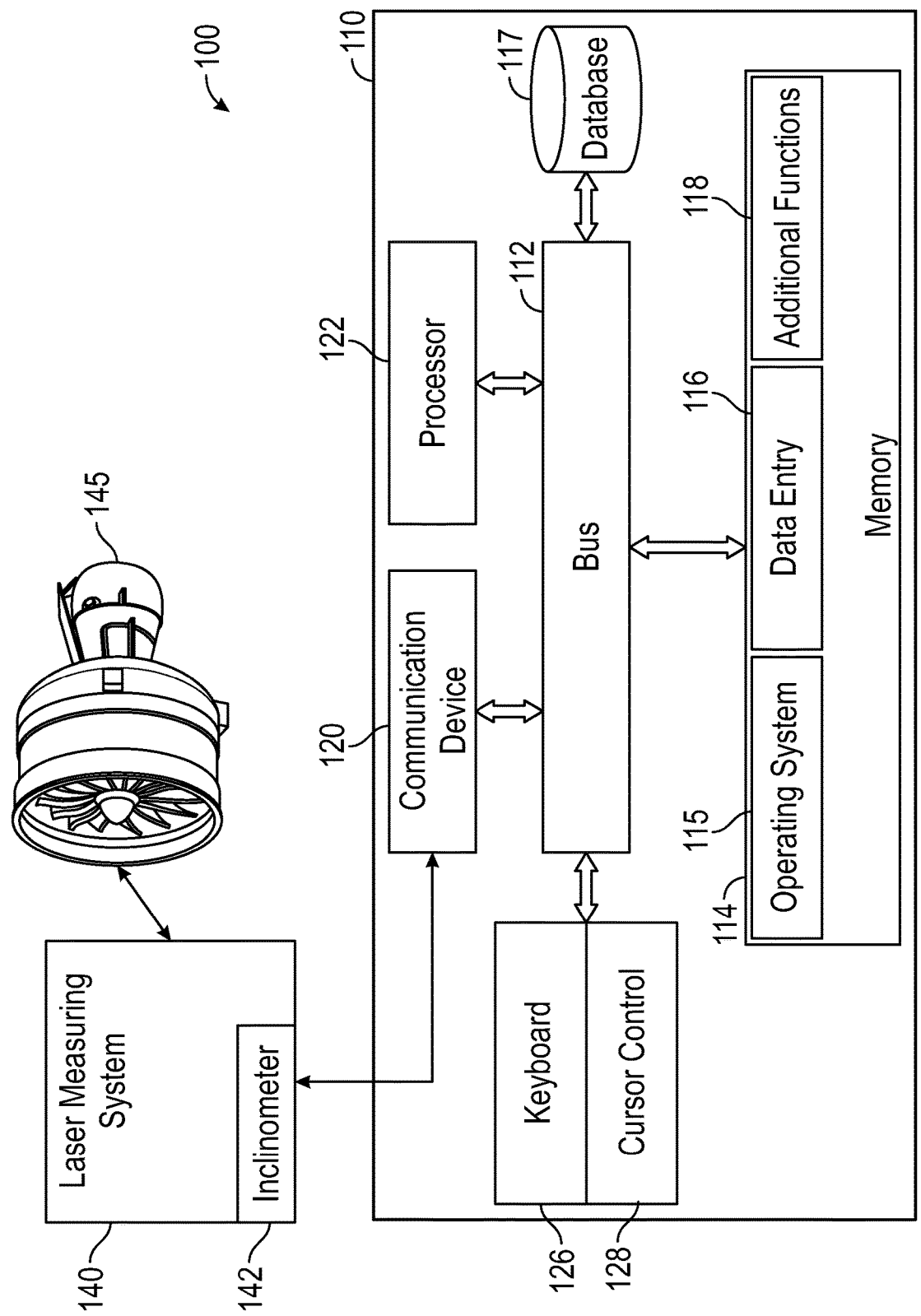
FIG. 1 is a block diagram of a computer-based blade tip clearance system, according to an embodiment of the present disclosure.

FIG. 1, illustrates, in an embodiment, computer-based blade tip clearance system 100. As shown in FIG. 1, computer-based blade tip clearance system 100 may include a system console 110 that includes a bus 112 and/or other communication mechanism(s) configured to communicate information between the various components of system console 110, such as a processor 122 and a memory 114. In addition, a communication device 120 may enable connectivity between processor 122 and other devices by encoding data to be sent from processor 122 to another device over a wired or wireless communication connection or network, such as the Internet, and decoding data received from another system, such as a laser measuring system 140 with an inclinometer 142 performing measurements on a fan 145, over the communication connection for processor 122.

In another example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

In an embodiment, system console 110 may include a processor 122 and other components communicating through a wired or wireless network, or any other communication medium, to the laser measuring system 140. System console 110 may include a user interface that enables interaction by a user or technician. System console 110 may include device drivers that enable software applications to interface with hardware devices. In an example embodiment of system console 110 may include a touch screen and may also include a device driver to recognize and translate user input gestures into commands or signals capable of being used by applications. An input device interface may interface with the touch screen device driver of system console 110 to receive user touch screen gestures.

Processor 122 may include one or more general or specific purpose processors to perform computation and control functions of system console 110. Processor 122 may include a single integrated circuit, such as a micro processing device, or may include multiple integrated circuit devices and/or circuit boards working in cooperation to accomplish the functions of processor 122. In addition, processor 122 may execute computer programs, such as an operating system 115, a data entry module 116, and application 118, stored within memory 114.

System console 110 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system console 110. The modules can include an operating system 115, data entry module 116 configured to provide data entry via a user interface, and all other functionality disclosed herein, as well as other additional functionality modules, such as application 118.

Memory 114, being non-transitory, may include a variety of computer-readable medium that may be accessed by processor 122. For example, memory 114 may include any combination of random-access memory ("RAM"), dynamic RAM ("DRAM"), static RAM ("SRAM"), read only memory ("ROM"), flash memory, cache memory, and/or any other type of non-transitory computer-readable medium.

System console 110 may further include a keyboard 126 and a cursor control device 128, such as a computer mouse, to enable a user to interface with system console 110. System console 110 further may include a database 117 coupled to bus 112 to provide centralized storage for data entry module 116 and application 118 and to store, for example, Point of Service data as well as data for displaying the UI widget for date entry, customer data, etc. The system console 110 may be any type of computer, controller, or computing device, whether stand alone or as a component within an electronic device with or without additional external components. Database 117 can store data in an integrated collection of logically related records or files. Database 117 can be an operational database, an analytical database, a curriculum database, a data warehouse, a distributed database, an end-user database, an external database, a navigational database, an in-memory database, a document-oriented database, a real-time database, a relational database, an object-oriented database, or any other database known in the art. Further, any or all the databases can be an encrypted database.

Although shown as a single system, the functionality of system console 110 may be implemented as a distributed system. For example, memory 114 and processor 122 may be distributed across multiple different computers that collectively make up system console 110. System console 110 may be remotely located from the remainder of computer-based blade tip clearance system 100, which may function as a processor, server, web server, or other computing device. Further, one or more components of system console 110 may not be included. For example, for functionality as a user or consumer device, system console 110 may be a smartphone or other wireless device that includes a processor, memory, and a display, and includes additional components not shown in FIG. 1, such as an antenna, transceiver, or any other suitable wireless device component.

FIG. 2 illustrates a blade tip clearance inspection system 200, according to an embodiment of the present disclosure. The blade tip clearance inspection system 200 includes a fan casing 210, also referred to as a fan containment case assembly, disposed around a fan rotor assembly 215, also referred to as a fan rotor, which includes multiple fan blades 220 where the fan rotor assembly 215 may rotate around an axis A shown as axis 260. The inside of fan casing 210 may be lined with a fan case abradable surface 240. In some Fan Stator Modules, fan rotor assembly 215 may include a mounted spinner cone 250. Spinner cones are a streamlined fairing that may be fitted over a hub or as shown in FIG. 2, at the center of a turbine engine. Spinner cones reduce aerodynamic drag and smooth airflow that enters the air intake through fan blades 220 more efficiently.

Blade tip clearance inspection system 200 also illustrates a bracket 230 mounted to spinner cone 250. Bracket 230 includes a mounted inclinometer 236, which in FIG. 2 is shown mounted near spinner cone 250 but may be mounted anywhere along the bracket 230. Inclinometer 236's function is to determine the angular position of bracket 230 within fan casing 210. Bracket 230 may also include a laser measuring head unit 235, also referred to herein as a laser module, and an amplifier 232.

The laser measuring head unit 235 is designed to transmit a laser beam directed towards the inside of fan casing 210, which may or may not include the fan case abradable surface 240. The projected laser beam is then reflected from the inside surface of fan casing 210, also referred to as the fan, and received by the laser measuring head unit 235. Upon receiving the reflected laser beam, the laser measuring head unit may define a path length the laser beam has traveled, thus determining a distance between the laser measuring head unit 235 and the fan casing 210, or the fan case abradable surface 240. Typically, an ideal range for the distance between the laser measuring head unit 235 and the fan casing 210, or the fan case abradable surface 240 is between 0.252 inches and 0.400 inches.

As bracket 230 is affixed to the fan rotor assembly 215, in an embodiment by the securing of one or more bolts to spinner cone 250, so as the fan rotor assembly 215 is rotated the laser measuring head unit 235 may determine distances between the laser measuring head unit 235 and the fan casing 210 at multiple points circumferentially around the fan casing 210. In an embodiment, the rotation of the fan rotor assembly 215 may be done manually. In another embodiment the rotation of the fan rotor assembly 215 may be done by some type of mechanical or electrical assistance, either within the fan rotor assembly 215 or externally. Note than in FIG. 2, bracket 230 is located in between two adjacent fan blades.

In an embodiment, the distance measurements from laser measuring head unit 235 may include an analog signal that may be passed to amplifier 232. The signal from amplifier 232 may then be transmitted via wire or wirelessly to a computing device, such as system console 110. The amplifier in FIG. 2 is shown mounted on bracket 230 but may be located anywhere. Further, the analog signal may be converted using an analog to digital converter anywhere along its path or at system console 110 where the digital distance data can then be processed by system console 110.

Figure 3:
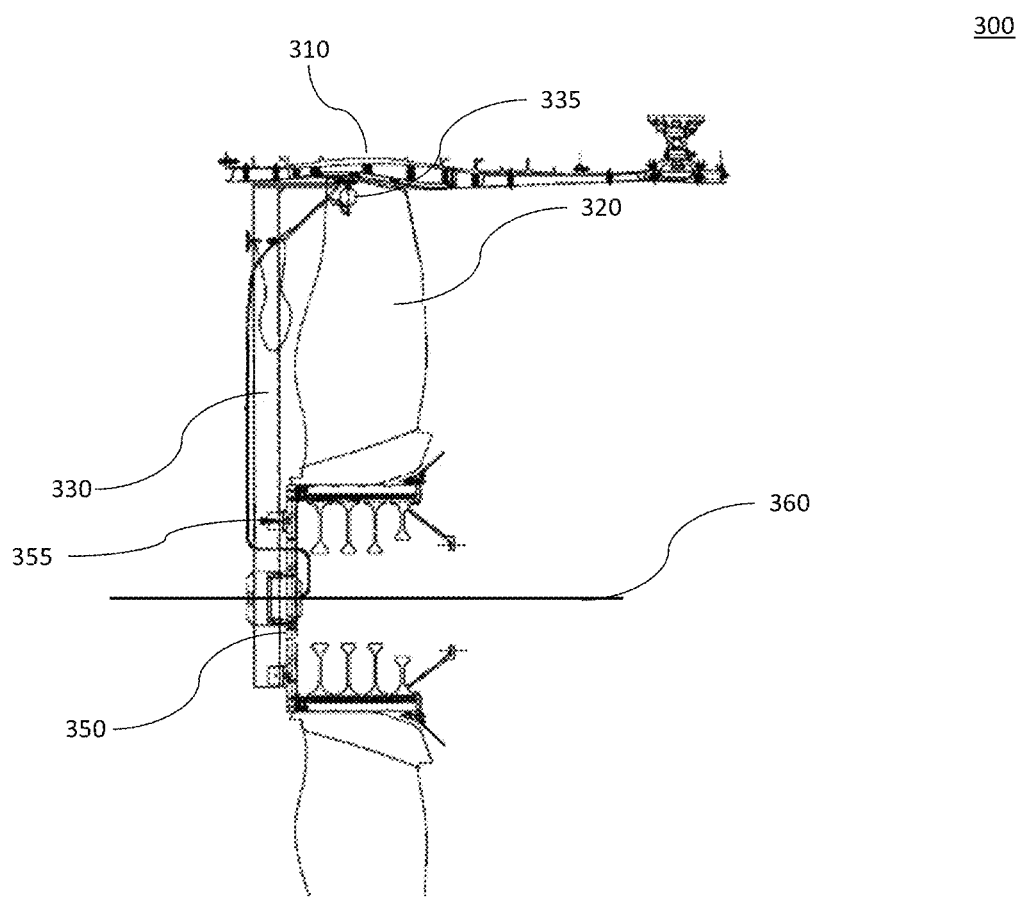
FIG. 3 illustrates a side view of a blade tip clearance system affixed to a fan disk, illustrating an inspection method, according to an embodiment of the present disclosure.

FIG. 3 illustrates a side view of a blade tip clearance inspection system 300, according to an embodiment of the present disclosure. The blade tip clearance inspection system 300 includes a fan casing 310, one or more fan blades 320, and a bracket 330 affixed to rotor assembly 350. In an embodiment, the bracket 330 is affixed to the rotor assembly 350 using one or mounting fasteners 355. In another embodiment, instead of mounting fasteners 355, other means of adhesion know by a person of ordinary skill in the art may be used. Such fastening means can include a vacuum, adhesives, magnetic or any other known method of temporarily affixing two or more objects together.

Blade tip clearance inspection system 300 is shown mounted on rotor assembly 350 where there is no spinner cone. Thus, the bracket 330 may be affixed directly to the rotor assembly 350. However, the operation of bracket 330 with laser measuring head unit 335 may operate in the same manner as described in FIG. 2, e.g., distance measurements and circumferential position measurements may be obtained while rotor assembly 350 is rotated about axis A 360.

Figure 4:
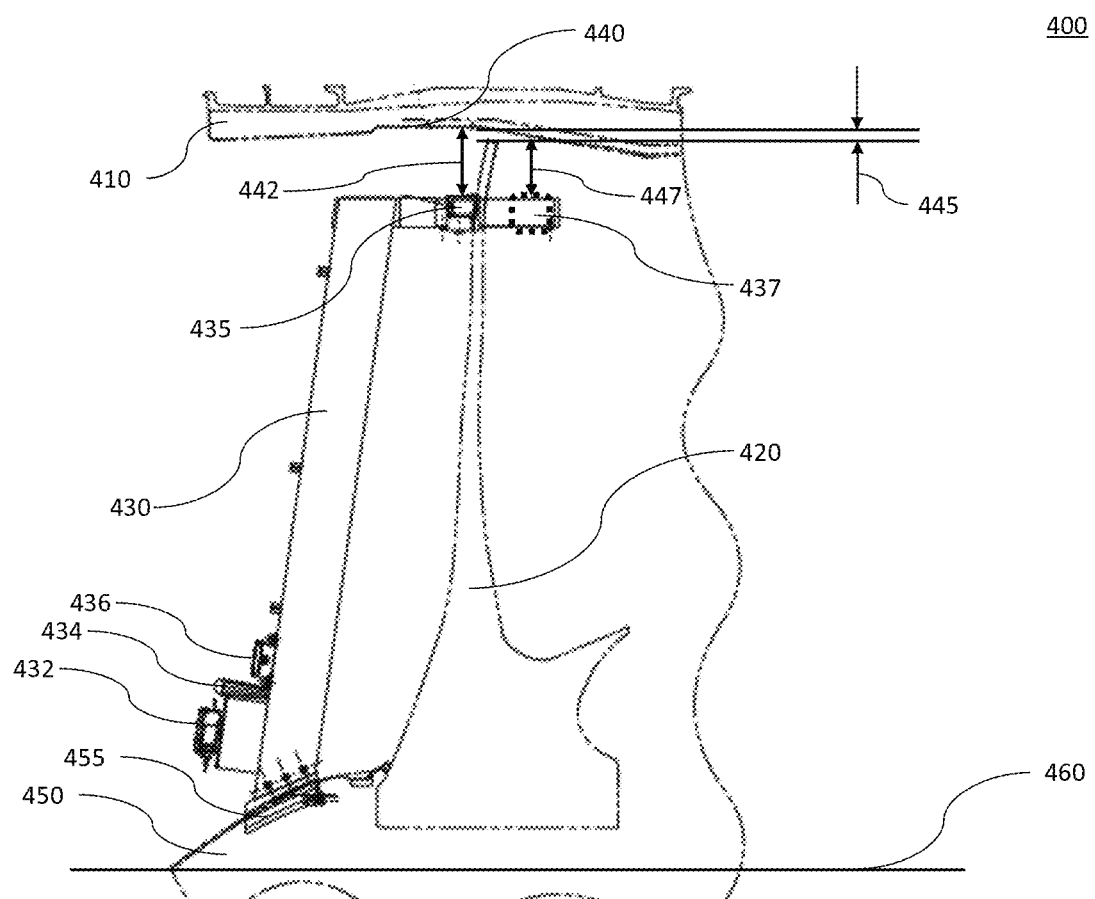
FIG. 4 illustrates a side view of a blade tip clearance system affixed to a spinner cone of a fan, according to an embodiment of the present disclosure.

FIG. 4 illustrates a side view of a blade tip clearance inspection system 400, according to an embodiment of the present disclosure. The blade tip clearance inspection system 400 includes a fan casing 410 disposed around a rotor assembly that includes multiple fan blades 420 that may rotate around an axis A shown as axis 460. The inside of fan casing 410 may be lined with an abradable layer 440. In some fans, as shown in FIG. 4, bracket 430 is affixed to spinner cone 450. Blade tip clearance inspection system 400 also illustrates bracket 430 affixed to spinner cone 450 at mounting head 455.

In some embodiments, mounting head 455 may include captive fasteners wherein the fasteners are retained in the mounting head 455, thereby eliminating the chance of a fastener coming loose while attaching bracket 430 to the spinner cone 450 for testing and measuring.

Bracket 430 may also include a mounted inclinometer 436, a knob 434, an amplifier 432. Knob 434 could also be any type of handle, where knob 434 may be used to assist in the turning of the rotor assembly for measuring various circumferential points around the fan casing 410.

FIG. 4 also illustrates a gap 442, which is the gap between laser measuring head unit 435 and the inside surface of fan casing 410. In an embodiment, the lengths of each of the fan blades 420 is known, e.g., each is measured. In addition, the dimensions of bracket 430 are known. Also, the bracket may be made of a lightweight material, for example tubular aluminum. In an embodiment, the weight of the bracket 430 is less than 13 pounds. However, the bracket 430 may be constructed of any number of high strength materials or composites whereby the deflection of the bracket at any angle of rotation within the fan casing 410 is negligible, i.e., within 3% of the tip clearance gap. Therefore, by obtaining the gap 442 measurement the gap 445 measurement, i.e., the gap between the edge of a particular fan blade 420 and the inside of the fan casing 410 at any angular position as determined by inclinometer 436 may be determined.

Further, laser measuring head unit 435 may be located at various positions along the top of bracket 430, as indicated by position 437 where the laser measuring head unit would be measuring a gap 447, which is a gap between laser measuring head unit 435 and the inside of fan casing 410 either at another position of the edge of fan blade 420 or axially behind fan blade 420. In an embodiment, the area of fan casing 410 being measured at position 437 may be axially behind an abradable layer area of the fan casing 410.

Figure 5A:
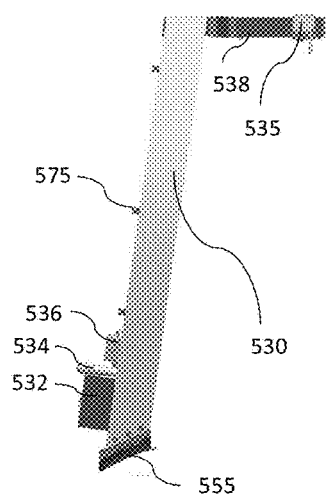

FIGS. 5A-5E illustrate five detailed views of a blade tip clearance inspection system 500, according to at least one embodiment of the present disclosure. FIG. 5A shows a bracket 530 that includes a mounting head 555, where mounting head 555 may be affixed to a rotor assembly. In particular, mounting head 555 illustrates a configuration used to mount to a spinner cone of a rotor assembly.

FIG. 5A also show a laser measuring head unit 535 attached to an offset bracket 538 of the bracket 530. Also shown are an inclinometer 536, knob 534, and an amplifier 532, whose functions have previously been discussed and incorporated herein. FIG. 5A also illustrates the use of cable guides 575 that may be used to route a cable from the laser measuring head unit 535 that may contain power and data to and from the laser measuring head unit 535.

Figure 5B:
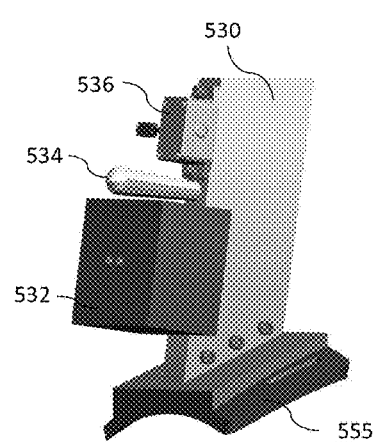

FIG. 5B shows a detail view of bracket 530 that includes an inclinometer 536, knob 534, and an amplifier 532. FIG. 5B also illustrates a detail view of mounting head 555.

Figure 5C:
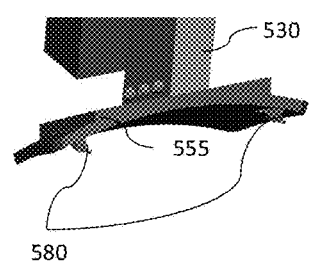

FIG. 5C illustrates a detail view of the lower portion of bracket 530 showing mounting head 555 where the mounting head 555 contains two captive fasteners 580 that may be used to attach the bracket 530 to a rotor assembly.

Figure 5D:
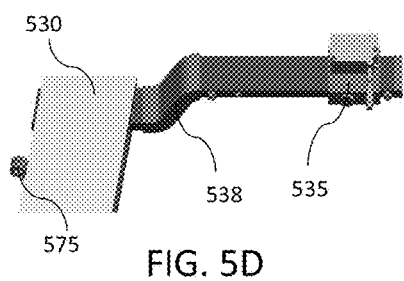

FIG. 5D illustrates a detail view of the upper portion of bracket 530 showing the cable guide 575, the offset bracket 538 and the laser measuring head unit 535.

Figure 5E:
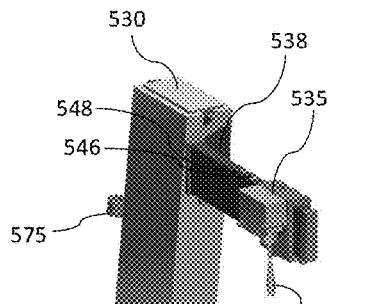

FIG. 5E illustrates a detail side perspective view of the upper portion of bracket 530 showing the cable guide 575, the offset bracket 538 and the laser measuring head unit 535. FIG. 5E also illustrates positioning hole 546 and positioning hole 548. Positioning holes 546 and 548 may be used to position the laser measuring head unit at other positions along the offset bracket 538 to measure different gap areas on an inside surface of a rotor assembly. FIG. 5E also illustrates a cable 537 attached to laser measuring head unit 535 in an embodiment. In an embodiment, laser measuring head unit 535 may also include a wireless laser unit negating the need for a cable such as cable 537.

FIGS. 6A and 6B illustrate two views of a blade tip clearance inspection system 600, according to an embodiment of the present disclosure. FIG. 6A illustrates bracket 630 affixed to spinner cone 650 where bracket 630 also includes a bracket arm 638 that extends between two of the fan blades 620 and has affixed to it laser measuring head unit 635. Laser measuring head unit 635 determines a distance between it and the abradable layer 640, where bracket 630 may be manually rotated a complete 360 degrees, thus allowing for the gap measurement between the ends of fan blades 620 and abradable layer 640.

FIG. 6A also illustrates a possible mounting method to the spinner cone 650, according to an embodiment. Notice that that are two types of fasteners, e.g., bolts, shown on the spinner cone. Radial fastener 670 is oriented radially and may attach the spinner cone 650 to the underlying rotor. In addition, axial fasteners 676 are oriented in an axial direction and may also fasten the spinner cone 650 to the rotor. The mounting head 655 may contain one or more captive fasteners 680 that are oriented axially and may affix the bracket 630 to the spinner cone 650. In an embodiment, the affixing of bracket 630 to spinner cone 650 may be accomplished by removing two of the axial fasteners bolts and then affixing bracket 630 to the spinner cone 650 with the two captive fasteners 680. In another embodiment, bracket 630 may have one or more captive fasteners 680 that are oriented in a radial direction in which case one or more radial fasteners could be removed from spinner cone 650 and then affix bracket 630 to spinner cone 650 using one or more captive radial fasteners.

FIG. 6B illustrates bracket 630 that may also include the bracket arm 638 that extends between two of the fan blades 620 and has affixed to it laser measuring head unit 635. Also shown in FIG. 6B is a laser beam 645 from laser measuring head unit 635 shining on abradable layer 640. In addition, FIG. 6B show cable 637 routed through cable guide 675.

FIG. 7 illustrates a blade tip clearance system 700 with a laser sensor at a first position, according to an embodiment of the present disclosure. Blade tip clearance system 700 may include a laser measuring head unit 735 affixed to bracket arm 730 and bracket 720. In an embodiment, laser measuring head unit 735 is connected to a power source and can transmit and/or receive data via a cable 737 and produce a laser 745 that is used to determine a distance between laser measuring head unit 735 and an inner portion of a fan casing such as an abradable layer 740. Laser measuring head unit 735 may also be manually adjusted using selector screw 738 to be moved to other positions along bracket arm 730, e.g., second position 746 and third position 748. Positions 746 and 748 are just illustrative and could be located at any position along bracket arm 730 and include any number of positions.

FIG. 8 illustrates a blade tip clearance system 800 with a laser sensor at a second position, according to an embodiment of the present disclosure. Blade tip clearance system 800 may include a laser measuring head unit 735 affixed to bracket arm 730 and bracket 720. In an embodiment, laser measuring head unit 835 is connected to a power source and can transmit and/or receive data via a cable 837 and produce a laser 795 that is used to determine a distance between laser measuring head unit 835 and an inner portion of a fan casing such as an abradable layer 840. Laser measuring head unit 835 may also be manually adjusted using selector screw 838 to be moved to other positions along bracket arm 830, e.g., first position 844 and third position 848. Positions 844 and 848 are just illustrative and could be located at any position along bracket arm 830 and include any number of positions.

FIG. 9 illustrates a blade tip clearance system 900 with a scanning laser sensor, according to an embodiment of the present disclosure. Blade tip clearance system 900 may include a laser measuring head unit 935 affixed to bracket arm 930 and bracket 920. In an embodiment, laser measuring head unit 935 is connected to a power source and can transmit and/or receive data via a cable 937 and produce a scanning laser 945 that is used to determine a distance between laser measuring head unit 935 and an inner portion of a fan casing such as an abradable layer 940 at multiple radial positions. Rather than moving laser measuring head unit 935 to different positions along bracket arm 930 as illustrated in FIGS. 7 and 8, the laser measuring head unit 935 may be equipped with a scanning laser that is capable of scanning a wide variety of points radially along the inner surface of a fan casing.

FIG. 10 shows an exemplary embodiment of a method 1000 for determining blade tip clearance in a fan case, according to an embodiment of the present disclosure. Method 1000 begins at step 1005 with the installation of a bracket onto a fan rotor, or in some cases a fan spinner rotor, where the bracket is located between adjacent fan blades that are connected to the fan rotor. Further, the bracket includes a laser module and an inclinometer that are affixed to the bracket. The inclinometer is designed to measure a circumferential position of the bracket with the attached laser module. For example, as discussed in FIGS. 2-9, or specifically in FIG. 2 where bracket 230 is attached to spinner cone 250 and includes laser measuring head unit 235 and inclinometer 236. If a fan does not have a spinner cone, then, as shown and discussed in FIG. 3, bracket 330 can be attached to the rotor assembly 350 where the bracket 330 can be rotated around an axis "A" 360.

The bracket may be installed between two adjacent fan blades versus in some inspection scenarios it may be necessary to remove the spinner cone and at least one of the fan blades to perform a blade tip clearance inspection. Removing a fan blade causes several concerns. Such a removal takes time, possibly a number of hours. Also, removal of a fan blade disrupts the balance of the fan stator module as each blade could weigh approximately 50 pounds. With a missing blade the entire fan blade assembly becomes unstable and not easily rotatable by hand. As the bracket with the attached laser module and inclinometer may weigh only 12 or thirteen pounds it is easily manageable by a single person. Further, when a spinner cone is removed, there is a risk or damage to the spinner cone and/or the rotor and the removed mounting hardware must be tracked and accounted for.

As discussed in FIG. 6, attaching bracket 630 to the spinner cone 650 may be accomplished by removing two of the axial fasteners from the spinner cone 650 and attach bracket 630 using captive fastener bolts that are within the bracket 630. Using the existing axial fastener positions on the spinner cone 650 to attach bracket 630 minimizes or otherwise reduces the labor and complexity associated with an inspection and typically can be done in approximately 30 minutes versus 4-5 hours if a fan blade would have to be removed.

Step 1010 may include rotating the fan rotor with the attached laser module, wherein the laser module comprises a laser sensor. As mentioned in step 1005, since no fan blade must be removed, the fan rotor remains balanced, and thus the rotor can be turned manually. Or, as discussed in FIG. 2, some type of mechanical or electrical assistance could be employed to rotate the rotor. Rotating the rotor also rotates that bracket and the attached laser module and inclinometer thereby allowing distance measurements and angular data to be obtained around the entire inner perimeter of the fan casing.

Step 1015 may include projecting, from the laser sensor, a laser beam toward the fan case shell as the fan rotor is rotated. The laser beam may also be projected towards an inner diameter of the fan casing shell. As shown in FIG. 6, the laser measuring head unit 635 generates a laser beam and projects it towards the inner shell of the fan casing as shown by the laser beam 645. Also, as discussed in FIGS. 2-6, the inner shell of the fan casing may contain an abradable layer such as abradable layer 440 or 640.

Step 1020 may include receiving, by the laser sensor, a reflected laser beam from the inner diameter of the fan casing shell, thereby defining a path length indicative of a distance between the laser module and the fan case or shell for a plurality of points disposed circumferentially around the fan case, for example as shown in FIGS. 2-6. In addition, as illustrated in FIG. 4, laser measuring head unit 435 may generate a laser beam directed at the inner perimeter of fan casing 410. In such an embodiment, the laser beam may then be reflected back to the laser measuring head unit 435. Then, using circuitry well known by a person of ordinary skill in the art, the distance between the laser measuring head unit 435 and the fan casing 410 may be determined, as shown by gap 442. Also, as shown in FIG. 4, bracket 430 is of known dimensions and thus bracket 430 need not be the same length as a fan blade 420. In an embodiment, an inspection includes first measuring the length of each of the fan blades and then using bracket 430 with laser measuring head unit 435 and inclinometer 436 the gap 442 can be determined for all the positions in a 360-degree sweep of the rotor. Or alternatively, only select points could be chosen to measure, e.g., at inclinometer points 12 o'clock, 3 o'clock, 6 o'clock and 9 o'clock.

Step 1025 may include determining, by the inclinometer, a circumferential position of the laser module. As discussed, an inclinometer is a well-known device that is used for measuring angles of slope or tilt. Accordingly, an inclinometer, e.g., inclinometer 236, 436, and 536, may be used to determine a circumferential position of the bracket, e.g., bracket 230, 330, 430, 530, 630, 730, 830, and 930, in relationship to the fan casing. Thus, when a distance between the laser module and the fan casing is determined, it is also known where circumferentially that measurement was determined.

Step 1030 may include transmitting, by the laser module, a distance measurement, and a circumferential position for each of the plurality of points to a computing device. One the laser module determines a distance measurement, such as for gap 442, that information, whether in analog or digital form may be sent to a computing device, such as the system console 110 in FIG. 1. In one embodiment, the distance measurement may be an analog signal that is sent to system console 110 where, either within system console 110 or externally, the analog signal is converted using an analog-to-digital converter ("ADC") where that data could be received by a data port on system console 110. Without detracting from a wired method of transmitted data to system console 110, the data may also be sent wirelessly, or through the Internet or a cloud service. In addition to the distance measurement being sent, the angular data from the inclinometer may also be sent where a specific inclinometer data point is associated with a corresponding laser measurement data.

Step 1035 may include processing, by the computing device, the distance measurement and circumferential position for each of the plurality of points. As the computing device, e.g., system console 110, receives distance and angular data, the computing device may process that data and store such data in a database, e.g., database 117, for later analysis and possible corrective action.

Step 1040 may include determining, by the computing device, a clearance distance between a fan blade and the fan case or the fan abradable inner diameter of the fan casing shell. As discussed, the length measurements of each of the fan blades may be taken prior to the installing of a bracket in step 1005, where such data may be input to the computing device. The computing device may then determine based on the input data a clearance distance between each fan blade and the fan case or shell. Further, as mentioned in step 1035, once a clearance distance is determined, a corrective action may be initiated. Such corrective action may include a replacement, repair, or re-working of one or more components. Such corrective action may also just include a notation, such as an entry in a database, for future action.

The description and abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

The disclosure contained herein includes, for example, Example 1 is a system for determining a fan blade clearance of a fan case relative to a fan rotor, the system comprising a bracket attached to the fan rotor and configured to hold a laser module between adjacent fan blades connected to the fan rotor. The bracket is further configured to hold an inclinometer, wherein the inclinometer is configured to measure a circumferential position of the laser module. The laser module comprises a laser sensor configured to transmit a laser beam toward the fan case as the fan rotor is rotated to receive a reflected laser beam from the fan case, thereby defining a path length indicative of a distance between the laser module and the fan case for a plurality of points disposed circumferentially around the fan case. The laser module is further configured to transmit distance measurements to a computing device for the plurality of points and the inclinometer is configured to transmit circumferential position measurements to the computing device. The computing device is configured to process the distance measurements and the circumferential position measurements to determine a clearance distance between a fan blade and the fan case at the circumferential position, wherein based on the determined distance exceeding a threshold a corrective action is initiated.

An Example 2 is a system of any preceding clause where the bracket may also be further configured to allow the laser module to be located at a second position on the bracket along an axis of rotation of the fan rotor. An Example 3 is a system of any preceding clause where the bracket may also be attached to the fan rotor using an adhesive, a magnetic, or a vacuum. An Example 4 is a system of any preceding clause where the fan rotor may also further comprise a spinner cone and wherein the bracket is attached to the fan rotor at the spinner cone. An Example 5 is a system of any preceding clause where attaching the bracket to the fan rotor at the spinner cone may comprise removal of one or more axially positioned existing spinner cone fasteners. An Example 6 is a system of any preceding clause where the laser module may comprise a scanning laser configured to transmit a plurality of laser beams toward the fan case along an axis of rotation of the fan rotor, thereby defining the path length indicative of the distance between the laser module and the fan case for the plurality of points disposed circumferentially and axially around the fan case. An Example 7 is a system of any preceding clause where the laser module may be configured to transmit the distance measurements to the computing device wirelessly. An Example 8 is a system of any preceding clause where the system may further comprise an amplifier and an analog-to-digital converter (ADC), wherein the amplifier is configured to receive a signal from the laser sensor and output an analog value representing a measured distance. An Example 9 is a system of any preceding clause where wherein the clearance distance may be classified as ideal if the distance between the fan blade and the fan case is determined to be between 0.252 inches and 0.400 inches.

The disclosure contained herein may include a method, for example, an Example 10 of inspecting fan blade clearance of a fan case relative to a fan rotor, the method comprising rotating the fan rotor, wherein a bracket is attached to the fan rotor between adjacent fan blades connected to the fan rotor, where the bracket comprises a laser module and an inclinometer configured to measure a circumferential position of the laser module, and wherein the laser module comprises a laser sensor. The method includes projecting, from the laser sensor, a laser beam toward the fan case as the fan rotor is rotated. The method may include receiving, by the laser sensor, a reflected laser beam from the fan case, thereby defining a path length indicative of a distance between the laser module and the fan case for a plurality of points disposed circumferentially around the fan case, and determining, by the inclinometer, the circumferential position of the laser module. The method may also include transmitting, by the laser module, a distance measurement and a circumferential position data for each of the plurality of points to a computing device, processing, by the computing device, the distance measurement and the circumferential position data for each of the plurality of points, and determining, by the computing device, a clearance distance between a fan blade and the fan case, and initiating a corrective action based on the determined clearance distance exceeding a threshold value.

An Example 11 is a method of any preceding clause where the method may further comprise relocating the laser module to a second position on the bracket along an axis of rotation of the fan rotor. An Example 12 is a method of any preceding clause where the bracket is attached to the fan rotor using an adhesive, a magnet, or a vacuum. An Example 13 is a method of any preceding clause where the bracket is attached to the fan rotor with a spinner cone. An Example 14 is a method of any preceding clause the bracket is attached to the fan rotor and comprises the removing of one or more axially positioned existing spinner cone fasteners. An Example 15 is a method of any preceding clause where the rotating, projecting, receiving and transmitting may be performed utilizing a single person in approximately 30 minutes. An Example 16 is a method of any preceding clause where The method, wherein the bracket to the fan rotor that comprises a spinner cone, and the attaching of the bracket to the fan rotor may negate any requirement to remove the spinner cone from the fan rotor. An Example 17 is a method of any preceding clause further comprising classifying the clearance distance as ideal if the distance between the fan blade and the fan case is determined to be between 0.252 inches and 0.400 inches.

An Example 18 is a computer readable storage medium comprising instructions which when executed, cause a machine to at least rotate the fan rotor, wherein a bracket is attached to the fan rotor between adjacent fan blades connected to the fan rotor, where the bracket comprises a laser module and an inclinometer configured to measure a circumferential position of the laser module with the laser module, and wherein the laser module comprises a laser sensor. The instructions include causing the machine to at least project, from the laser sensor, a laser beam toward the fan case as the fan rotor is rotated; receive, by the laser sensor, a reflected laser beam from the fan case, thereby defining a path length indicative of a distance between the laser module and the fan case for a plurality of points disposed circumferentially around the fan case; determine, by the inclinometer, the circumferential position of the laser module; transmit, by the laser module, a distance measurement and a circumferential position data for each of the plurality of points to a computing device; process, by the computing device, the distance measurement and the circumferential position data for each of the plurality of points; determine, by the computing device, a clearance distance between a fan blade and the fan case; and initiate a corrective action based on the determined clearance distance exceeding a threshold value.

An Example 19 is a method of any preceding clause where the non-transitory computer readable storage medium further includes instructions which when executed, cause the machine to at least relocate the laser module to a second position on the bracket along an axis of rotation of the fan rotor. An Example 20 is a method of any preceding clause wherein the bracket is attached to the fan rotor using an adhesive, a magnet, or a vacuum.

What is claimed is:

1. A system for determining a fan blade clearance of a fan case relative to a fan rotor, the system comprising:
    a bracket having a first end directly affixed to an outer surface of a spinner cone located at a center of the fan rotor, the bracket being configured to hold a laser module between adjacent fan blades connected to the fan rotor, the laser module being attached at a second end of the bracket opposite the first end thereof;
    the bracket further configured to hold an inclinometer, the inclinometer configured to measure a circumferential position of the laser module;
    the laser module comprising a laser sensor configured to transmit a laser beam toward the fan case as the fan rotor is rotated to receive a reflected laser beam from the fan case, thereby defining a path length indicative of a distance between the laser module and the fan case for a plurality of points disposed circumferentially around the fan case;
    the laser module further configured to transmit distance measurements to a computing device for the plurality of points;
    the inclinometer configured to transmit circumferential position measurements to the computing device; and
    the computing device configured to process the distance measurements and the circumferential position measurements to determine a clearance distance between a fan blade and the fan case at the circumferential position, wherein based on the determined clearance distance exceeding a threshold a corrective action is initiated.

2. The system of claim 1, wherein the bracket is further configured to allow the laser module to be located at a second position on the bracket along an axis of rotation of the fan rotor.

3. The system of claim 1, wherein the bracket is attached to the spinner cone using an adhesive, a magnet, or a vacuum.

4. The system of claim 1, wherein affixing the bracket to the spinner cone comprises removal of one or more axially positioned existing spinner cone fasteners.

5. The system of claim 1, wherein the laser module comprises a scanning laser configured to transmit a plurality of laser beams toward the fan case along an axis of rotation of the fan rotor, thereby defining the path length indicative of the distance between the laser module and the fan case for the plurality of points disposed circumferentially and axially around the fan case.

6. The system of claim 1, wherein the laser module is configured to transmit the distance measurements to the computing device wirelessly.

7. The system of claim 1, further comprising an amplifier and an analog-to-digital converter (ADC), wherein the amplifier is configured to receive a signal from the laser sensor and output an analog value representing a measured distance.

8. The system of claim 1, wherein the clearance distance is classified as ideal if the distance between the fan blade and the fan case is determined to be between 0.252 inches and 0.400 inches.

9. A method of inspecting fan blade clearance of a fan case relative to a fan rotor, the method comprising:
- rotating the fan rotor, wherein a first end of a bracket is directly affixed to an outer surface of a spinner cone located at a center of the fan rotor, the bracket being arranged between adjacent fan blades connected to the fan rotor, wherein the bracket comprises a laser module being attached at a second end of the bracket opposite the first end thereof; and an inclinometer configured to measure a circumferential position of the laser module, and wherein the laser module comprises a laser sensor;
- projecting, from the laser sensor, a laser beam toward the fan case as the fan rotor is rotated;
- receiving, by the laser sensor, a reflected laser beam from the fan case, thereby defining a path length indicative of a distance between the laser module and the fan case for a plurality of points disposed circumferentially around the fan case;
- determining, by the inclinometer, the circumferential position of the laser module;
- transmitting, by the laser module, a distance measurement and a circumferential position data for each of the plurality of points to a computing device;
- processing, by the computing device, the distance measurement and the circumferential position data for each of the plurality of points;
- determining, by the computing device, a clearance distance between a fan blade and the fan case; and
- initiating a corrective action based on the determined clearance distance exceeding a threshold value.

10. The method of claim 9, further comprising relocating the laser module to a second position on the bracket along an axis of rotation of the fan rotor.

11. The method of claim 9, wherein the bracket is attached to the spinner cone using an adhesive, a magnet, or a vacuum.

12. The method of claim 9, further comprising removing one or more axially positioned existing spinner cone fasteners.

13. The method of claim 9, wherein the rotating, projecting, receiving, and transmitting are performed utilizing a single person in 30 minutes.

14. The method of claim 9, further comprising attaching the bracket directly to the fan rotor, wherein the attaching negates any requirement to remove the spinner cone from the fan rotor.

15. The method of claim 9, further comprising classifying the clearance distance as ideal if the distance between the fan blade and the fan case is determined to be between 0.252 inches and 0.400 inches.

16. A non-transitory computer readable storage medium comprising instructions which when executed, cause a machine to at least:
- rotate a fan rotor, wherein a first end of a bracket is directly affixed to an outer surface of a spinner cone located at a center of the fan rotor, the bracket being arranged between adjacent fan blades connected to the fan rotor, wherein the bracket comprises a laser module being attached at a second end of the bracket opposite the first end thereof; and an inclinometer configured to measure a circumferential position of the laser module with the laser module, and wherein the laser module comprises a laser sensor;
- project, from the laser sensor, a laser beam toward a fan case as the fan rotor is rotated;
- receive, by the laser sensor, a reflected laser beam from the fan case, thereby defining a path length indicative of a distance between the laser module and the fan case for a plurality of points disposed circumferentially around the fan case;
- determine, by the inclinometer, the circumferential position of the laser module;
- transmit, by the laser module, a distance measurement and a circumferential position data for each of the plurality of points to a computing device;
- process, by the computing device, the distance measurement and the circumferential position data for each of the plurality of points;
- determine, by the computing device, a clearance distance between a fan blade and the fan case; and
- initiate a corrective action based on the determined clearance distance exceeding a threshold value.

17. The non-transitory computer readable storage medium of claim 16, further including instructions which when executed, cause the machine to at least relocate the laser module to a second position on the bracket along an axis of rotation of the fan rotor.

18. The non-transitory computer readable storage medium of claim 16, wherein the bracket is attached to the fan rotor using an adhesive, a magnet, or a vacuum.

* * * * *